(12) United States Patent
Liu et al.

(10) Patent No.: US 12,539,766 B2
(45) Date of Patent: Feb. 3, 2026

(54) CONTROL DEVICE FOR VEHICLE (71) Applicant: DENSO CORPORATION, Kariya (JP)

(72) Inventors: Haibo Liu, Kariya (JP); Keisuke Kawai, Kariya (JP); Akira Sakamoto, Kariya (JP); Tatsuya Takagi, Kariya (JP); Shigeru Kamio, Kariya (JP)

(73) Assignee: DENSO CORPORATION, Kariya (JP)

( * ) Notice: Subject to any disclaimer, the term of this patent is extended or adjusted under 35 U.S.C. 154(b) by 176 days.

(21) Appl. No.: 18/213,334

(22) Filed: Jun. 23, 2023

(65) Prior Publication Data

US 2023/0331092 A1 Oct. 19, 2023

Related U.S. Application Data

(63) Continuation of application No. PCT/JP2021/044609, filed on Dec. 6, 2021.

(30) Foreign Application Priority Data

Dec. 23, 2020 (JP) .................................. 2020-213653

(51) Int. Cl.
*H02P 7/00* (2016.01)
*B60L 7/18* (2006.01)

(52) U.S. Cl.
CPC ........... *B60L 7/18* (2013.01); *B60L 2240/423* (2013.01); *B60L 2260/22* (2013.01)

(58) Field of Classification Search
CPC .. H02P 6/28; H02P 29/032; H02P 6/10; B60L 7/18
See application file for complete search history.

(56) References Cited

U.S. PATENT DOCUMENTS

2014/0379190 A1    12/2014    Sawada

FOREIGN PATENT DOCUMENTS

| EP | 3056402 B1 | | 3/2019 |
|---|---|---|---|
| EP | 3 078 539 B1 | | 7/2019 |
| JP | H10-191510 A | | 7/1998 |
| JP | 2007008238 A | * | 1/2007 |
| JP | 2013-158221 A | | 8/2013 |
| JP | 2016-28913 A | | 3/2016 |

* cited by examiner

*Primary Examiner* — Karen Masih
(74) *Attorney, Agent, or Firm* — Oliff PLC (57) ABSTRACT

A control device for a vehicle includes an operation controller that controls operations of a rotating electric machine mounted to the vehicle, a first torque detector that detects a traveling torque which is a braking/driving torque to be output from the rotating electric machine when the vehicle is traveling, a second torque detector that detects a standstill torque which is a braking/driving torque to be output from the rotating electric machine upon the vehicle coming to a stop, and a waveform setter that sets a stop waveform which is a waveform indicating a time variation in the braking/driving torque output from the rotating electric machine from the traveling torque to the standstill torque. The operation controller performs a stop process that is a process to bring the vehicle to a stop while changing the braking/driving torque output from the rotating electric machine in accordance with the stop waveform.

8 Claims, 8 Drawing Sheets

CONTROL DEVICE FOR VEHICLE

CROSS-REFERENCE TO RELATED APPLICATION

This application is a continuation application of International Application No. PCT/JP2021/044609 filed Dec. 6, 2021 which designated the U.S. and claims priority to Japanese Patent Application No. 2020-213653 filed with the Japan Patent Office on Dec. 23, 2020, the contents of each of which are incorporated herein by reference.

BACKGROUND

Technical Field

The present disclosure relates to a control device for a vehicle.

Related Art

Vehicles equipped with rotating electric machines as driving force sources for traveling have undergone a widespread distribution. Such rotating electric machines are also called "motor generators." In a vehicle equipped with a rotating electric machine, the driving force of the rotating electric machine is used not only during acceleration of the vehicle, but also during deceleration of the vehicle. A known control device is capable of adjusting the amount of regeneration of the rotating electric machine and thereby adjusting the braking force of the vehicle.

DESCRIPTION OF SPECIFIC EMBODIMENTS

The magnitude of braking force generated by a rotating electric machine is generally set according to an amount of brake actuation by a vehicle driver.

However, when the braking force is continuously generated according to the amount of brake actuation until the vehicle is brought to a stop, the vehicle may vibrate significantly in the longitudinal direction after the vehicle stops, causing the occupants to feel discomfort. Such vibrations are caused by torsions in the power transmission member (e.g., drive shaft) disposed between the rotating electric machine and the wheels, which occurs during braking, being released after the vehicle speed reaches zero.

The known control device, as disclosed in JP 2013-158178 A, limits the amount of regeneration to a smaller amount as the vehicle speed decreases when the vehicle is about to come to a stop. However, it is considered difficult to sufficiently suppress vibrations when stopping the vehicle, simply by limiting the amount of regeneration according to the vehicle speed. For example, when braking is initiated during traveling at a low speed, there may be a sudden decrease in vehicle speed, resulting in a sudden change in braking force, which may result in a failure to suppress vibrations when the vehicle stops. Depending on a method of adjusting the braking force, this may cause the occupants to feel that the braking force is zero before coming to a stop (i.e., while the vehicle is traveling), which is known as "drop in G-force" discomfort. Thus, there was room for further improvement in the conventional method of stopping a vehicle with the braking force of a rotating electric machine.

In view of the foregoing, it is desired to have a control device capable of bringing a vehicle to a stop properly with the braking force of a rotating electric machine.

According to one aspect of the present disclosure, a control device for a vehicle includes an operation controller that controls operations of a rotating electric machine mounted to the vehicle, a first torque detector that detects a traveling torque which is a braking/driving torque to be output from the rotating electric machine when the vehicle is traveling, a second torque detector that detects a standstill torque which is a braking/driving torque to be output from the rotating electric machine upon the vehicle coming to a stop, and a waveform setter that sets a stop waveform which is a waveform indicating a time variation in the braking/driving torque output from the rotating electric machine from the traveling torque to the standstill torque. The operation controller is configured to perform a stop process that is a process to bring the vehicle to a stop while changing the braking/driving torque output from the rotating electric machine in accordance with the stop waveform.

Such a control device sets the stop waveform, which is a waveform indicating the time variation from the traveling torque to the standstill torque, and brings the vehicle to a stop while changing the braking/driving torque in accordance with the stop waveform. The braking/driving torque is not changed according to a vehicle speed, but is changed in accordance with the preset stop waveform, which allows the vehicle to be brought to a stop appropriately, no matter under what conditions braking is initiated.

The embodiments will be described with reference to the accompanying drawings. In the drawings, to facilitate understanding of the description, the same components are assigned the same reference numbers and duplicated description thereof will be omitted.

A first embodiment will now be described. A control device 10 of the present embodiment is mounted to a vehicle 100 and is configured as a device for controlling the operations of the vehicle 100. Prior to describing the control device 10, the configuration of the vehicle 100 will be described first with reference to FIG. 1.

Figure 1:
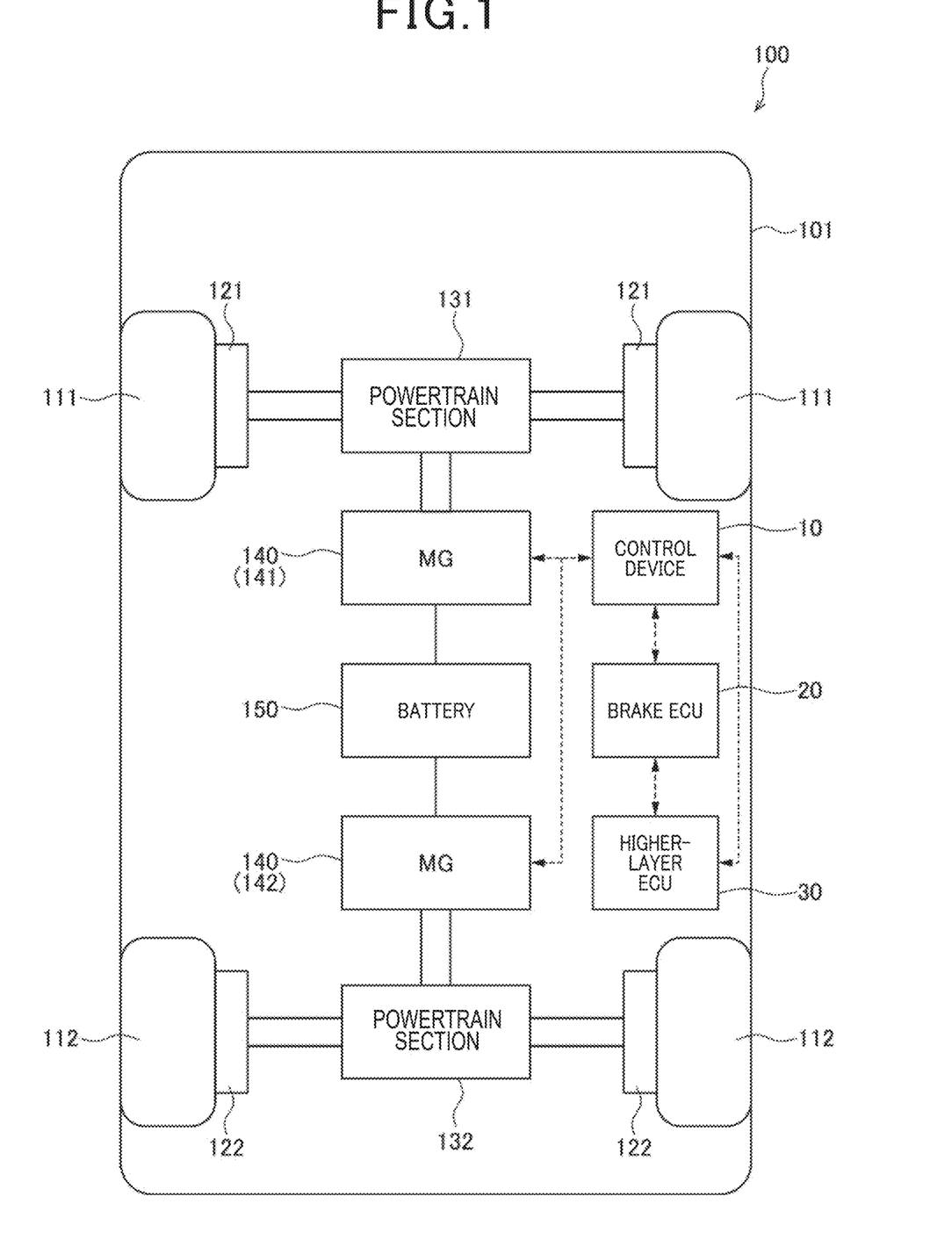
FIG. 1 is a schematic of a configuration of a vehicle equipped with a control device according to a first embodiment.

The vehicle 100 includes a body 101, wheels 111 and 112, rotating electric machines 141 and 142, and a battery 150.

The vehicle body 101 is a body portion of the vehicle 100 and is generally referred to as a "body." The wheels 111 are a pair of wheels provided on the front side portion of the vehicle body 101, and the wheels 112 are a pair of wheels provided on the rear side portion of the vehicle body 101. A total of four wheels are provided on the vehicle 100. In the present embodiment, these four wheels 111 and 112 are all driving wheels.

The rotating electric machine 141 is a device that is supplied with electric power from the battery 150, described later, to generate a driving force to rotate the wheels 111, that is, to drive the vehicle 100 for traveling. The rotating electric machine 141 is a so-called "motor generator." The driving force generated by the rotating electric machine 141 is transmitted to the respective wheels 111 via the powertrain section 131 to rotate the wheels 111. Power is transferred between the battery 150 and the rotating electric machine 141 via an inverter that is a power converter. The inverter is not shown in FIG. 1.

The rotating electric machine 142 is supplied with electric power from the battery 150 and generates a driving force to rotate the wheels 112. The rotating electric machine 142 is a "motor generator" like the above rotating electric machine 141. The driving force generated by the rotating electric machine 142 is transmitted to the respective wheels 112 via the power train section 132 to rotate the wheels 112. Transfer of power between the battery 150 and the rotating electric machine 142 is performed via an inverter that is a power converter. The inverter is not shown in FIG. 1. The inverter in the rotating electric machine 141 and the inverter in the rotating electric machine 142 are separate from each other.

Each of the rotating electric machine 141 and the rotating electric machine 142 is capable of generating a driving force to accelerate the vehicle 100 as well as a braking force to decelerate the vehicle 100 through regeneration. The torques generated by the rotating electric machine 141 and the like to drive or brake the vehicle 100 are also referred to as "braking/driving torques."

As described above, two rotating electric machines are mounted to the vehicle 100. In the present embodiment, these two rotating electric machines 141 and 142 are controlled by the control device 10 simultaneously and in the same manner. Thus, in the following, the rotating electric machines 141 and 142 are also collectively referred to as a "rotating electric machine 140." For example, when referring to "a torque output from the rotating electric machine 140" is meant the total value of braking/driving torques output from the respective rotating electric machines 141 and 142.

Each of the two wheels 111 is provided with a braking device 121. The braking device 121 is a device that applies a braking force to the corresponding wheel 111 with hydraulic pressure. Each of the two wheels 112 is provided with a braking device 122. The braking device 122 is a device that applies a braking force to the corresponding wheel 112 with hydraulic pressure.

Braking of the vehicle 100 may be performed by the rotating electric machines 141 and 142, or by the braking devices 121 and 122. As will be described later, in the present embodiment, braking of the vehicle 100 is basically performed by the rotating electric machine 140 only. Braking by the braking devices 121 and 122 is performed subsidiarily as needed.

The battery 150 is a rechargeable battery for supplying electric power to each of the rotating electric machines 141 and 142 to drive them. In the present embodiment, a lithium-ion battery is used as the battery 150.

The vehicle 100 includes a brake ECU 20 and a higher-layer ECU 30, in addition to the control device 10. Each of the control device 10, the brake ECU 20, and the higher-layer ECU 30 is configured as a computer system including a CPU, a ROM, a RAM, and the like. These ECUs may communicate bidirectionally with each other via a network installed in the vehicle 100.

The brake ECU 20 performs a process of controlling the operations of the braking devices 121 and 122 according to instructions from the higher-layer ECU 30 described later.

The higher-layer ECU 30 performs integrative control of the overall operation of the vehicle 100. The higher-layer ECU 30 performs processes necessary for controlling the vehicle 100 while communicating bidirectionally with each of the control device 10 and the brake ECU 20.

The control device 10, the brake ECU 20, and the higher-layer ECU 30 need not be separate from each other as in the present embodiment. For example, the functions of the brake ECU 20 and the higher-layer ECU 30 may be integrated into the control device 10. In implementing the functions of control device 10, which will be described later, the device configuration is not limited to any specific configuration.

Figure 2:
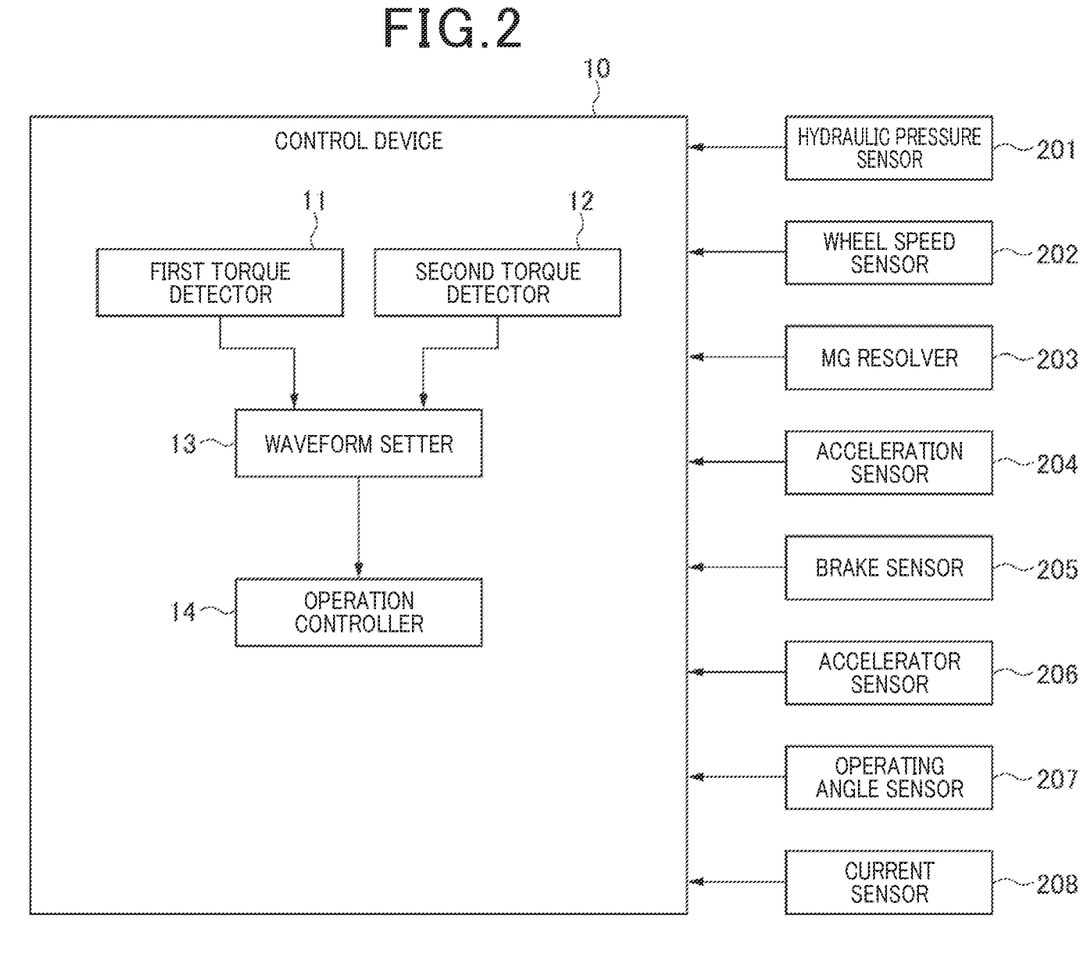
FIG. 2 is a schematic of a configuration of the control device according to the first embodiment.

Although not shown in FIG. 1, the vehicle 100 is equipped with a number of sensors for measuring various physical quantities. As illustrated in FIG. 2, the above sensors include a hydraulic pressure sensor 201, a wheel speed sensor 202, an MG resolver 203, an acceleration sensor 204, a brake sensor 205, an accelerator sensor 206, an operating angle sensor 207, and a current sensor 208.

The hydraulic pressure sensor 201 is a sensor for measuring the hydraulic pressure inside each of the brake devices 121 and 122. Although the hydraulic pressure sensor 201 is schematically depicted as a single block in FIG. 2, the hydraulic pressure sensor 201 is provided, one for each of the brake devices 121 and 122. A signal indicating the hydraulic pressure measured by each hydraulic pressure sensor 201 is transmitted to the control device 10 via the brake ECU 20.

The wheel speed sensor 202 is a sensor for measuring the number of rotations per unit time of each of the wheels 111 and 112. Although the wheel speed sensor 202 is schematically depicted as a single block in FIG. 2, the wheel speed sensor 202 is provided, one for each of the four wheels 111 and 112. A signal indicating the number of rotations measured by the wheel speed sensor 202 is transmitted to the control device 10. The control device 10 may determine the travel speed of the vehicle 100 based on the signal.

The MG resolver 203 is a sensor for measuring the number of rotations per unit time of the output shaft of each of the rotating electric machines 141 and 142. Although the MG resolver 203 is schematically depicted as a single block in FIG. 2, the MG resolver 203 is provided, one for the output shaft of each of the rotating electric machines 141 and 142. A signal indicating the number of rotations measured by the MG resolver 203 is transmitted to the control device 10. The control device 10 may also determine the travel speed of the vehicle 100 based on such signal.

The acceleration sensor 204 is a sensor for detecting an acceleration of the vehicle 100. The acceleration sensor 204 is mounted to the vehicle body 101. The acceleration sensor 204 is configured as a 6-axis acceleration sensor capable of detecting the longitudinal, lateral, and vertical accelerations of the vehicle body 101, as well as the pitching, rolling, and yawing rotational accelerations. A signal indicating each acceleration detected by the acceleration sensor 204 is transmitted to the control device 10.

The brake sensor 205 is a sensor for detecting an amount of depression of a brake pedal (not shown) installed at the driver's seat of the vehicle 100. A signal indicating the amount of depression of the brake pedal detected by the brake sensor 205 is transmitted to the control device 10.

The accelerator sensor 206 is a sensor for detecting an amount of depression of an accelerator pedal (not shown) installed at the driver's seat of the vehicle 100. A signal indicating the amount of depression of the accelerator pedal detected by the accelerator sensor 206 is transmitted to the control device 10.

The operating angle sensor 207 is a sensor for detecting an operating angle of a steering wheel (not shown) installed at the driver's seat of the vehicle 100. A signal indicating the operating angle detected by the operating angle sensor 207 is transmitted to the control device 10.

The current sensor 208 is a sensor for detecting a value of drive current input to each of the rotating electric machines 141 and 142. Although the current sensor 208 is schematically depicted as a single block in FIG. 2, the current sensor 208 is provided, one for each of the rotating electric machine 141 and 142. A signal indicating the value of drive current detected by the current sensor 208 is input to the control device 10.

Still referring to FIG. 2, the configuration of the control device 10 will now be described. The control device 10 includes an operation controller 14, a first torque detector 11, a second torque detector 12, and a waveform setter 13, as block elements representing the functions of the control device 10.

The operation controller 14 performs a process of controlling the operations of the rotating electric machine 140. The operation controller 14 is capable of individually adjusting the braking/driving torque generated by each of the rotating electric machines 141 and 142. In the present embodiment, an example will be described in which the same braking/driving torque is generated by each of the rotating electric machines 141 and 142.

The first torque detector 11 performs a process of detecting a braking/driving torque to be output from the rotating electric machine 140 when the vehicle 100 is traveling. The "braking/driving torque to be output from the rotating electric machine 140 when the vehicle 100 is traveling" refers to a braking/driving torque to be output from the rotating electric machine 140 according to the driver's operation of the brake pedal or accelerator pedal. That is, it is the braking/driving torque to be output from the rotating electric machine 140 during normal traveling. Such a braking/driving torque is hereinafter also referred to as a "traveling torque."

The second torque detector 12 performs a process of detecting a braking/driving torque to be output from the rotating electric machine 140 upon the vehicle 100 coming to a stop. The "braking/driving torque to be output from the rotating electric machine 140 upon the vehicle 100 coming to a stop" refers to the braking/driving torque output from the rotating electric machine 140 upon the vehicle 100 coming to a stop, when the vehicle 100 is brought to a stop by the braking force of the rotating electric machine 140 alone, without using the braking devices 121 and 122. Such a braking/driving torque is hereinafter also referred to as a "standstill torque." When the vehicle 100 is brought to a stop solely by the braking force of the rotating electric machine 140, the braking/driving torque to be output from the rotating electric machine 140 will change from the above traveling torque to the standstill torque.

The waveform setter 13 performs a process of setting a stop waveform. The "stop waveform" is a waveform that indicates a time variation in the braking/driving torque output from the rotating electric machine 140 from the traveling torque to the standstill torque. The stop waveform may also be a waveform that indicates a time variation in target value of the braking/driving torque output from the rotating electric machine 140.

In normal operation, the operation controller 14 controls the rotating electric machine 140 such that the braking/driving torque output from the rotating electric machine 140 coincides with the traveling torque detected by the first torque detector 11. When bringing the vehicle in motion to a stop, the operation controller 14 controls the rotating electric machine 140 such that the braking/driving torque output from the rotating electric machine 140 varies in accordance with the stop waveform preset by the waveform setter 13. That is, the operation controller 14 performs a process of bringing the vehicle 100 to a stop while changing the braking/driving torque output from the rotating electric machine 140 from the traveling torque to the standstill torque in accordance with the stop waveform. This process is also referred to as a "stop process" in the following.

Figure 3A:
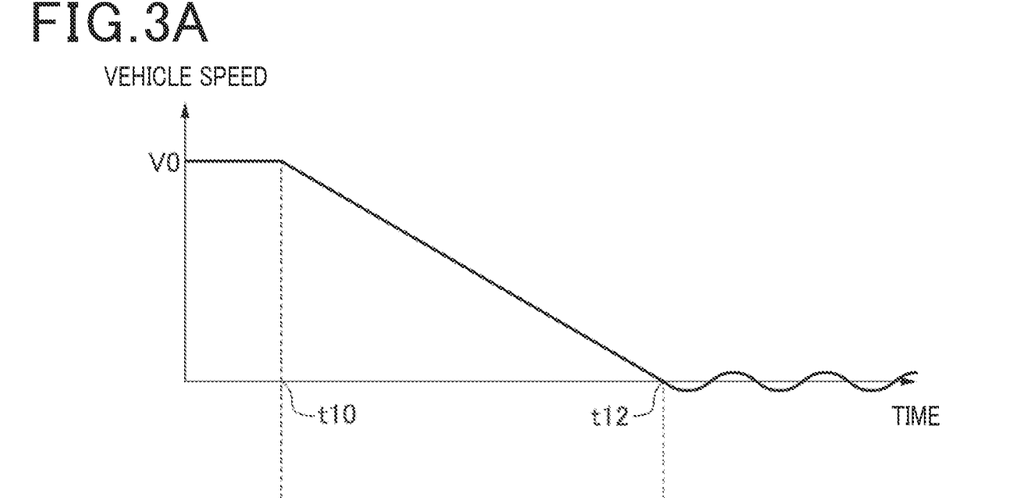
FIG. 3A is an illustration of a time variation in vehicle speed in a case where control is performed by a control device according to a comparative example.
Figure 3B:
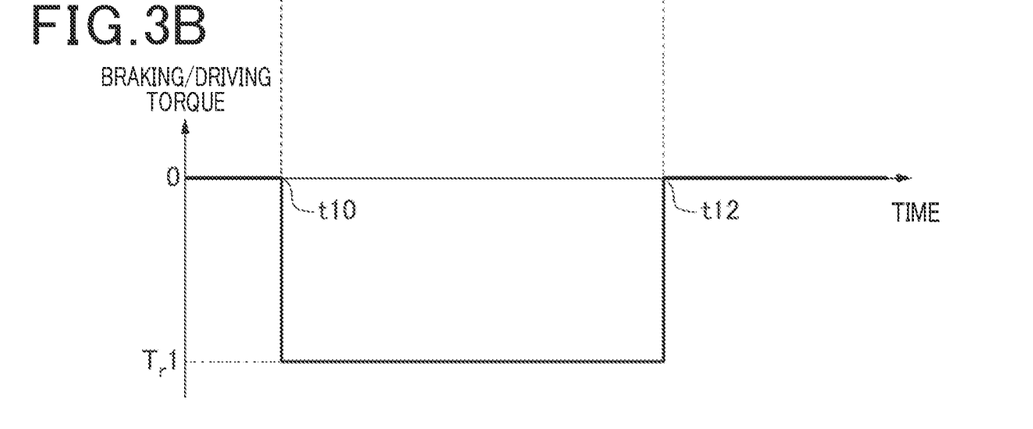
FIG. 3B is an illustration of a time variation in braking/driving torque in the case where control is performed by the control device according to the comparative example.

First, an example of a case where the vehicle 100 is brought to a stop as in a conventional manner, without performing the stop process, will be described with reference to FIG. 3. FIG. 3 illustrates an example of a case in which control is performed by a control device according to a comparative example and the vehicle 100 is thereby brought to a stop. FIG. 3A illustrates an example of variations over time in the vehicle speed of the vehicle 100. FIG. 3B illustrates an example of variations over time in the braking/driving torque output from the rotating electric machine 140.

In the example illustrated in FIG. 3, during a period until time t10, the vehicle 100 is traveling at a constant speed V0. In FIG. 3B, although the braking/driving torque during this period is zero, the braking/driving torque during this period may be a value other than zero.

At or after time t10, the brake pedal is being depressed by the driver. Accordingly, the value of the braking/driving torque is set to Tr1 at or after time t10. In the following, the sign of the braking/driving torque is set such that the direction in which the vehicle 100 is accelerated is positive and the direction in which the vehicle 100 is decelerated is negative. Therefore, as illustrated in FIG. 3B, the value of Tr1 above is a negative value.

As illustrated in FIG. 3A, at or after time t10, the vehicle speed of the vehicle 100 gradually decreases and reaches zero at time t12. Assuming that the amount of depression of the brake pedal is constant, the magnitude of the braking/ driving torque output from the rotating electric machine 140 in this comparative example is constant at Tr1 until time t12 when the vehicle 100 comes to a stop.

In the vehicle 100, members provided for transmitting the driving force of the rotating electric machine 140 to the wheels 111 or the like are hereinafter also referred to as "power transmission members." The power transmission members include, for example, powertrain sections 131 and 132, drive shafts, and the like.

During a period where the vehicle 100 is traveling while decelerating, that is, during a period from time t10 to time t12, the above power transmission members are in a state where torsions are occurring. Thereafter, when the vehicle 100 comes to a stop at time t12, torsions in the power transmission members are released. That is, the power transmission members try to return to their torsion-free state. Due to this effect, as illustrated in FIG. 3A, at or after time t12, the vehicle body 101 may vibrate, for example, in the longitudinal direction. Such vibrations are undesirable because it may cause discomfort to the occupants of the vehicle 100.

Figure 4A:
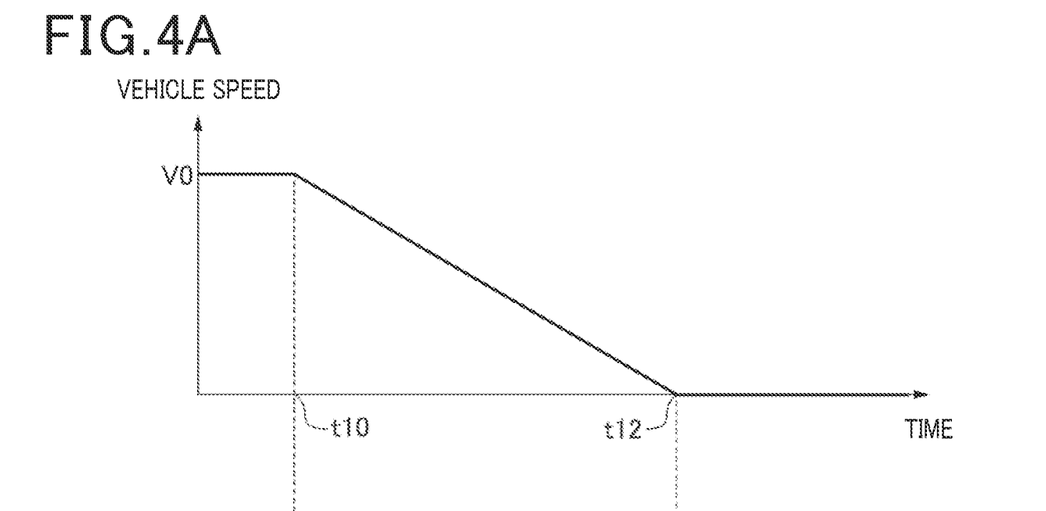
FIG. 4A is an illustration of a time variation in vehicle speed in a case where control is performed by the control device according to the first embodiment.
Figure 4B:
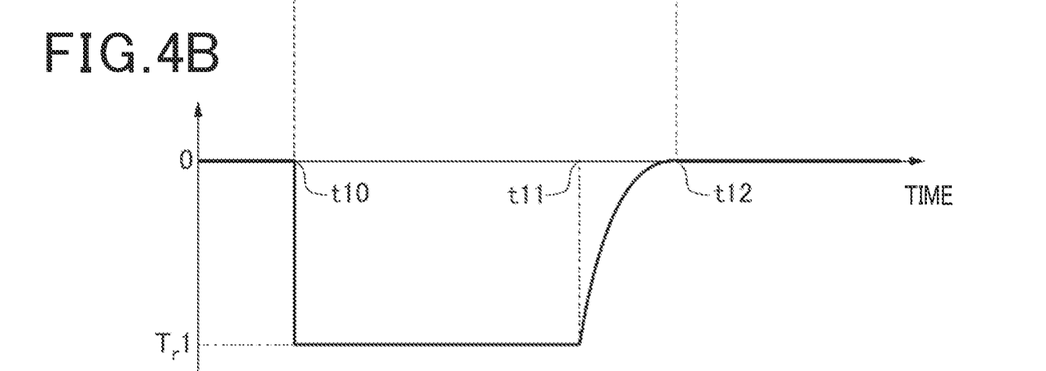
FIG. 4B is an illustration of a time variation in braking/driving torque in the case where control is performed by the control device according to the first embodiment.

The control device 10 of the present embodiment is configured to prevent occurrence of vibrations by appropriately setting the stop waveform as described above. With reference to FIG. 4, an example of the stop process performed by the control device 10 will be described. FIG. 4 illustrates a time variation in the vehicle speed and a time variation in the braking/driving torque when the stop process is performed in a similar manner as in FIG. 3.

In the example illustrated in FIG. 4, as in the example illustrated in FIG. 3, the vehicle 100 is traveling at a constant speed V0 during a period until time t10. At or after time t10, the brake pedal is being depressed by the driver.

During a period from time t10 to time t11, the braking/driving torque is set to Tr1, and the vehicle speed gradually decreases from V0. This Tr1 is the braking/driving torque detected by the first torque detector 11, that is, the braking/driving torque that is output according to the driver's operation of the brake pedal, as conventionally controlled.

At time t11 just before the vehicle comes to a stop, the stop process is initiated. In the stop process, the value of braking/driving torque output from the rotating electric machine 140 is changed from the traveling torque (Tr1 in this example) to the standstill torque (zero in this example) in accordance with the stop waveform. In the graph illustrated in FIG. 4B, the waveform during a period from time t11 to time t12 corresponds to the "stop waveform" described above.

When the stop process is performed, the value of braking/driving torque output from the rotating electric machine 140 does not change abruptly from the traveling torque to the standstill torque, but changes gradually over time. Therefore, the power transmission members, which have torsions due to braking, are restored to their torsion-free state during the period where the stop process is being performed. In other words, the stop waveform is preset as an appropriate waveform to allow the power transmission members in the state where torsions are occurring to return to the torsion-free state.

At time t12, the stop process is completed and the vehicle 100 is brought to a stop at the same time. At this timing, the torsions in the power transmission members disappear. Therefore, the vibrations of the vehicle body 101 as illustrated in FIG. 3A do not occur. According to the control device 10 of the present embodiment, the vehicle 100 may be brought to a stop appropriately by the braking force of the rotating electric machine 140.

Figure 5:
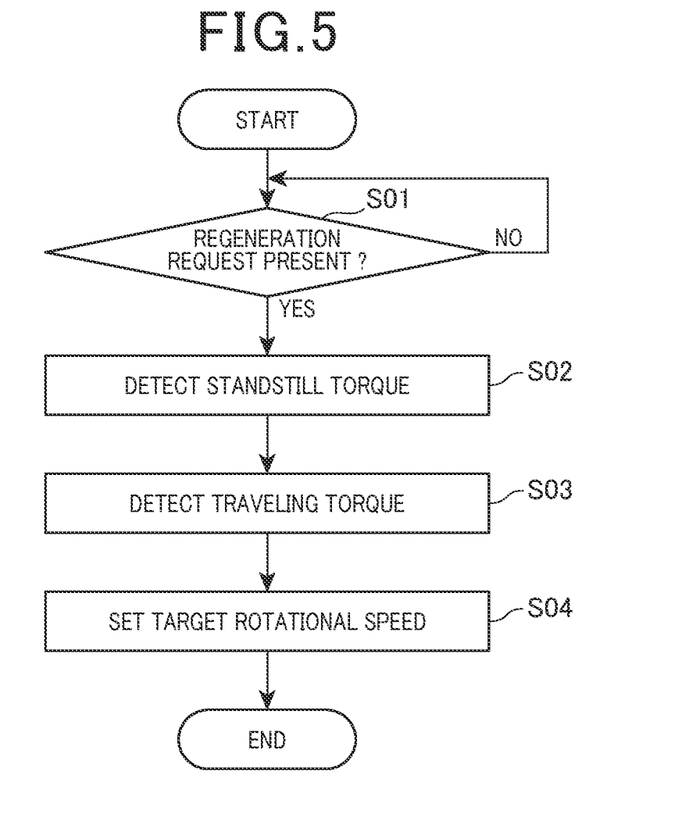
FIG. 5 is a flowchart of a process performed by the control device according to the first embodiment.

The specific process flow performed by the control device 10 to implement the stop process described above will now be described. The series of processes illustrated in FIG. 5 are performed by the control device 10, for example, at the timing when a need to bring the vehicle 100 to a stop arises. The process illustrated in FIG. 5 may be performed repeatedly each time a predefined control period elapses.

First, at step S01, it is determined whether a regeneration request has been transmitted from the higher-layer ECU 30. The "regeneration request" is a control signal transmitted from the higher-layer ECU 30 to the control device 10 when a need arises to generate a braking force by regeneration in the rotating electric machine 140. For example, when the driver depresses the brake pedal to bring the vehicle 100 to a stop, a regeneration request is transmitted from the higher-layer ECU 30. If the regeneration request has not been transmitted, the process step S01 is performed repeatedly. If a regeneration request has been transmitted, the process flow proceeds to step S02.

At step S02, the second torque detector 12 performs a process of detecting the standstill torque. As described above, the "standstill torque" is a braking/driving torque output from the rotating electric machine 140 at the time the vehicle 100 comes to a stop. A value of zero may always be detected as such a standstill torque. The second torque detector 12 in the present embodiment detects the standstill torque as a torque required for the vehicle 100 to remain stationary after the stop process is completed. For example, when the vehicle 100 is traveling on an ascending slope, setting the standstill torque to zero may cause the vehicle 100 to begin to move backward due to gravity after the stop process is completed. In this case, the second torque detector 12 will detect a value of the standstill torque greater than zero such that the vehicle 100 remains stationary against gravity.

The method of detecting the standstill torque by the second torque detector 12 will now be described. The second torque detector 12 calculates the standstill torque based on signals from the acceleration sensor 204. For example, the second torque detector 12 calculates a force applied to the vehicle body 101 in the direction of decelerating the vehicle 100 based on a difference between a deceleration of the vehicle 100 indicated by the acceleration sensor 204 and a deceleration of the vehicle 100 indicated by the wheel speed sensor 202 (hereinafter also referred to as a "deceleration force"). Since such a method of calculating the deceleration force is well known, the formula and the like are omitted.

The deceleration force calculated as above converted to a torque thereagainst may directly be used as the standstill torque. Since the above standstill torque calculated based on the signal from the acceleration sensor 204 includes errors arising from the turn resistance torque and brake torque, it is desirable to exclude these errors.

The "turn resistance torque" is a force detected by the acceleration sensor 204 as a force in the direction of the vehicle 100 decelerating apparently when the vehicle 100 is turning, converted to a torque thereagainst. The turn resistance torque Tgy may be calculated using the following equation (1).

$$T_{gy} = \frac{mV^2 \sin\left(\frac{\theta}{K_n}\right)^2}{L} \times L_r r \qquad (1)$$

In the equation (1), "m" is a mass of the vehicle 100 and "V" is a vehicle speed. "θ" is an operating angle detected by the operating angle sensor 207. "Kh" is a steering gear ratio. L" is a wheelbase length of the vehicle 100, "Lr" is a distance from the center of gravity of the vehicle 100 to the axle of the wheels 112 (i.e., rear wheels), and "r" is a radius of the wheels 111 and 112.

The "brake torque" is the braking force generated by the braking devices 121 and 122, converted to a torque thereagainst. The brake torque may be calculated, for example, based on signals from the brake ECU 20. Alternatively, the brake torque may be calculated based on signals from the brake sensor 205, signals from the hydraulic pressure sensor 201, or the like.

At step S02 in FIG. 5, the second torque detector 12 subtracts both the turn resistance torque and the brake torque from the standstill torque calculated using the deceleration force described above, and again detects the result of subtraction as the standstill torque.

At step S03 subsequent to step S02, a process of detecting the traveling torque is performed by the first torque detector 11. As described above, the "traveling torque" is a normal braking/driving torque output from the rotating electric machine 140 according to the driver's operation of the brake pedal or the accelerator pedal. Based on signals from the brake sensor 205 and the accelerator sensor 206, the first torque detector 11 refers to the traveling torque, for example, by referring to a map generated in advance.

At step S04 subsequent to step S03, a process of setting the target rotational speed is performed. This process is performed by the operation controller 14. The "target rotational speed" is a target value set for the number of rotations per unit time of the wheels 111 or the like detected by the wheel speed sensor 202. The stop process described above is initiated when the number of rotations per unit time of the wheels 111 or the like decreases to the target rotational speed.

The timing at which the stop process is initiated is hereinafter also referred to as a "target timing." The process of setting the target rotational speed by the operation controller 14 corresponds to a process of setting the predefined target timing for initiating the stop process. As described above, the target timing in the present embodiment is set as the timing when the number of rotations per unit time of the wheels 111 or the like decreases to the predefined target speed.

The target rotational speed ωs may be calculated according to the following equation (2).

$$\omega_s = \frac{\Delta T_r \cdot T}{I_v} \quad (2)$$

In the equation (2), "ΔTr" is a torque acquired by subtracting the standstill torque calculated at step S02 from the traveling torque calculated at step S03. "Iv" is a moment of inertia in rotation of the wheels 111 or the like, converted from the mass of the vehicle body 101. For example, Iv may be calculated according to the formula Iv=mr2 using m and r in the equation (1). In this way, the operation controller 14 is configured to set the target rotational speed ωs based on ΔTr that is a difference between the traveling torque and the standstill torque.

In the present embodiment, the shape of the stop waveform, which indicates changes in braking/driving torque in the stop process, is set to be a so-called "first-order lag" waveform. T in the equation (2) is a preset value as a time constant for such a stop waveform. The method of setting the time constant T will be described later.

After the target rotational speed ωs is set using the equation (2), the stop process is initiated upon the number of rotations per unit time of the wheels 111, etc. falling below the target rotational speed ωs. The vehicle speed of the vehicle 100 becomes 0 at approximately the same timing as when the stop process is completed. In this manner, the target rotational speed ωs, which indicates the target timing, is set such that the timing at which the braking/driving torque output from the rotating electric machine 140 becomes the standstill torque (i.e., the timing at which the stop process is completed) and the timing at which the vehicle 100 comes to a stop coincide with each other.

In setting the target rotational speed ωs, a relational expression different from the above equation (2) may be used as long as the point in time when the braking/driving torque output from the rotating electric machine 140 becomes the standstill torque and the point in time when the vehicle 100 comes to a stop coincide with each other. The "point in time when the vehicle 100 comes to a stop" does not have to be the point in time when the vehicle speed is completely zero. For example, it may be a point in time when the absolute value of the vehicle speed falls below a predefined small threshold value.

Figure 6:
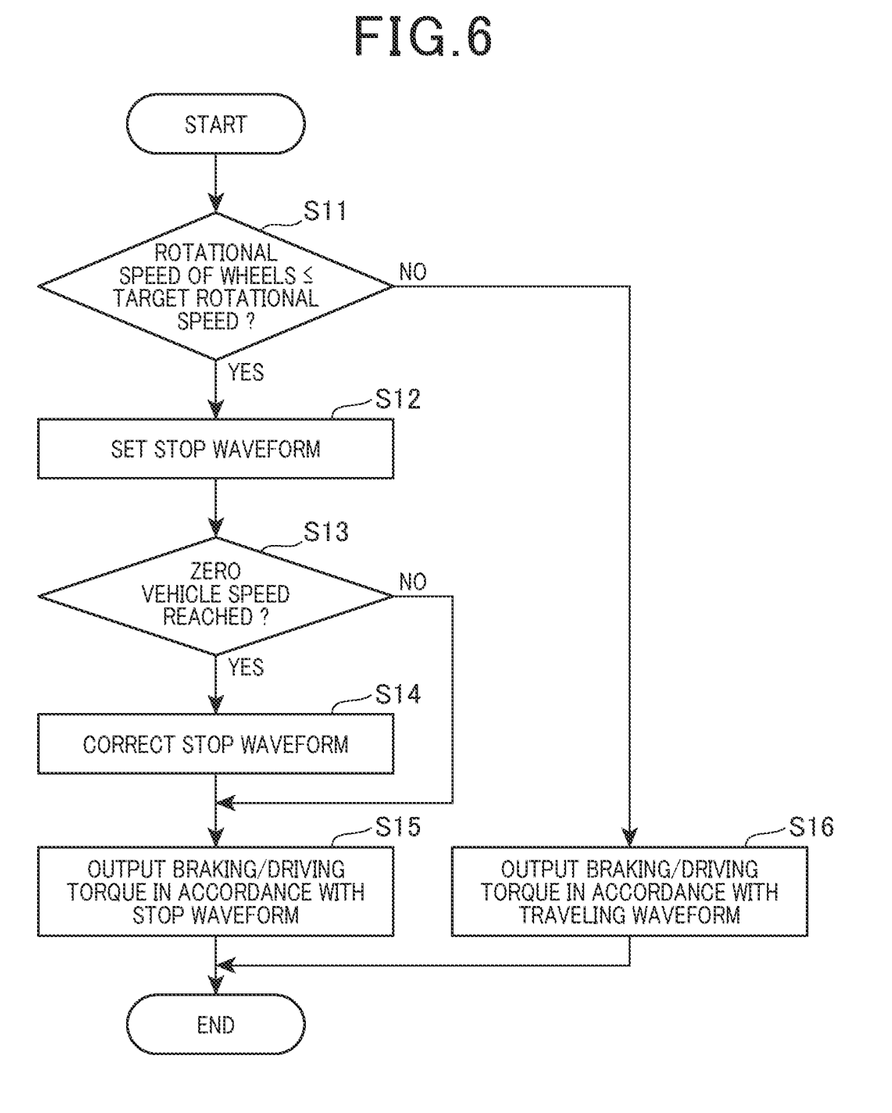
FIG. 6 is a flowchart of a process performed by the control device according to the first embodiment.

After completion of the process in FIG. 5, a series of processes illustrated in FIG. 6 are repeatedly performed by the control device 10. In this process, first, at step S11, it is determined whether the rotational speed measured by the wheel speed sensor 202, that is, the number of rotations per unit time of the wheels 111 or the like, is lower than or equal to the target rotational speed set at step S04 in FIG. 5. If the rotational speed measured by the wheel speed sensor 202 is higher than the target rotational speed, the process flow proceeds to step S16.

The determination at step S11 regarding the rotational speed may be made based on the rotational speed measured by the MG resolver 203. In this case, the rotational speed of the rotating electric machine 140 measured by the MG resolver 203 may be converted to the rotational speed of the wheels 111 or the like. The target rotational speed may be set as a target value for the rotational speed measured by the MG resolver 203. Where, the target timing for initiating the stop process is thus indirectly set with respect to the rotational speed of the wheels 111 or the like.

At step S16, the operation controller 14 performs a process of matching the braking/driving torque output from the rotating electric machine 140 to the traveling torque calculated at step S03 in FIG. 5. This process is performed during the period from time t10 to time t11 in the example of FIG. 4. Upon proceeding to step S16, the braking/driving torque output from the rotating electric machine 140 is made to be of a magnitude corresponding to the brake pedal operation performed by the driver. Although the vehicle speed of the vehicle 100 is gradually decreasing, the stop process is not yet performed at this point.

If, at step S11, the rotational speed measured by the wheel speed sensor 202 is lower than or equal to the target rotational speed, then the process flow proceeds to step S12. In this case, the stop process is initiated by proceeding to step S15 described later. Prior to initiating the stop process, at step S12, the waveform setter 13 performs a process of setting the stop waveform. The waveform setter 13 sets the stop waveform by using the following equation (3).

$$T_r(t) = \Delta T_r \left(1 - e^{-\frac{t}{T}}\right) \quad (3)$$

Tr(t) on the left side of the equation (3) is a function indicating a time variation in the target value of braking/driving torque output from the rotating electric machine 140. The waveform indicating this time variation corresponds to the stop waveform. "t" is an elapsed time from the timing at which step S12 was first performed, that is, from the timing at which the stop process was initiated.

On the right side of the equation (3), "ΔTr" is the same as ΔTr in the equation (2), that is, the torque acquired by subtracting the standstill torque calculated at step S02 in FIG. 5 from the traveling torque calculated at step S23 in the same figure. "T" is the same as T in the equation (2), that is, a preset value as the time constant of the stop waveform. The value of the time constant T is set by the waveform setter 13.

In a case where the value of the time constant T is set too large, the frequency of the waveform indicating changes in speed of the vehicle body 101 becomes too low during execution of the stop process, and the frequency of the waveform becomes lower than the pitch resonance frequency of the vehicle 100. As a result, pitching of the vehicle body 101 is less likely to occur. However, it is preferable to let the vehicle body 101 pitch in order to avoid giving the occupants a sense of discomfort, a so called a "drop in G-force" ("G-nuke" in Japanese), in which they feel that the braking force has become zero before the vehicle comes to a stop (i.e., while the vehicle is in motion). Therefore, the waveform setter 13 in the present embodiment sets the time constant T to a value less than the pitch resonance period such that the stop waveform becomes a waveform including a frequency component higher than the pitch resonance frequency of the vehicle 100.

The pitch resonance frequency fp of the vehicle 100 is calculated by the following equation (4).

$$f_p = \frac{1}{2\pi} \sqrt{\frac{22.3 g h_c}{0.14 L_t \cdot L}} \quad (4)$$

In the equation (4), "g" is the acceleration of gravity, "L" is the wheelbase length of the vehicle 100, "Lt" is the total length of the vehicle body 101, and "hc" is the height of the center of gravity of the vehicle body 101. The waveform setter 13 sets the value of the inverse of the pitch resonance frequency fp (i.e., the pitch resonance period of the vehicle 100) calculated as described above as the upper limit for the time constant T, and then sets the time constant T to be a value less than or equal to the upper limit. As a result, the stop waveform will be set as a waveform including a frequency component higher in frequency than the pitch resonance frequency of the vehicle 100. Therefore, the equation (4) may be used to determine the upper limit for the time constant T.

In a case where the value of time constant T is set too small, torsions in the power transmission members are released too quickly during the stop process being performed, and the occupants may thus feel the impact of the so-called backlash. The vehicle 100 may stop without torsions generated in the power transmission members being fully released, and the vehicle 100 may vibrate after coming to a stop. Thus, the waveform setter 13 sets the time constant T as a value that meets the condition shown in the following equation (5).

$$\frac{\Delta T_r}{K_d \cdot T} \leq 4.8 [\text{rad}/s] \quad (5)$$

In the equation (5), "ΔTr" is the same as ΔTr in the equation (2), that is, the torque acquired by subtracting the standstill torque calculated at step S02 in FIG. 5 from the traveling torque calculated at step S03 in FIG. 5. "Kd" is a coefficient indicating the rigidity of the power transmission members against torsions. The equation (5) may be regarded as a relational expression for determining the lower limit for the time constant T. Setting the time constant T to a value greater than or equal to the lower limit as described above allows the slope of the time variation of the stop waveform immediately after the stop process is initiated to be suppressed to a predefined value or less.

At step S12, the waveform setter 13 sets the value of the time constant T to be a value between the upper limit determined by the equation (4) and the lower limit determined by the equation (5), and sets the stop waveform using that time constant T and the equation (3). This can bring the vehicle 100 to a proper stop without causing the occupants to feel either the drop in G-force or the impact of backlash during the stop process being performed.

The value of the time constant T set by the waveform setter 13 may be a fixed preset value such that it always falls between the lower and upper limits described above. According to the calculated value of ΔTr, the time constant T may be calculated and set using the equation (5) or the like each time.

At step S13 subsequent to step S12, it is determined whether the vehicle speed has reached zero based on the rotational speed measured by the wheel speed sensor 202. If it is determined that the vehicle speed has not yet reached zero, the process flow proceeds to step S15 described later. If it is determined that the vehicle speed has reached zero, the process flow proceeds to step S14.

At step S14, a process of correcting the stop waveform is performed as needed. For example, in a case where there is an error in the calculation of the standstill torque and it is thus determined that it is difficult to keep the vehicle in the stationary state, the stop waveform is adjusted to keep the stationary state by a required torque being added to or subtracted from the entire stop waveform. Such torque adjustment may be performed based on, for example, variations in vehicle speed or the like immediately after the vehicle comes to a stop. After step S14, the process flow proceeds to step S15.

At step S15, the operation controller 14 performs a process of adjusting the braking/driving torque output from the rotating electric machine 140 to be of a magnitude in accordance with the stop waveform set at step S12. The series of processes illustrated in FIG. 6 are performed repeatedly and the process step S15 is performed each time, whereby the braking/driving torque output from the rotating electric machine 140 varies in accordance with the stop waveform, and finally the vehicle 100 is brought to a stationary state. In this manner, the stop process is implemented by repeating the process step S15. This is the process performed during the period from time t11 to time t12 in the example illustrated in FIG. 4.

When the series of process steps illustrated in FIG. 6 are performed repeatedly, the process step S12 is performed only for the first time, and is skipped for the second and subsequent times. In an alternative embodiment, the process step S12 may be performed each time, and the stop waveform may be adjusted according to the situation.

As shown in the equation (3), in the present embodiment, the shape of the stop waveform, which indicates changes in braking/driving torque in the stop process, is set to be a first-order lag waveform with a time constant T. The shape of the stop waveform does not necessarily have to be set to a first-order lag waveform, but may be set to any waveform, such as a first-order lag waveform. In any case, it is preferable that the stop waveform be set as a waveform that includes a component higher in frequency than the pitch resonance frequency of the vehicle 100, and that the slope of the time variation immediately after the stop process is initiated be set to be less than a predefined value.

FIG. 7 illustrates examples of various time variations when the stop process is performed. FIG. 7A illustrates an example of the time variation in the traveling torque detected by the torque detector 11. FIG. 7B illustrates an example of the time variation in the vehicle speed of the vehicle 100. FIG. 7C illustrates an example of the time variation of the regenerative request torque. The "regenerative request torque" is a requested value of the regenerative torque to be output from the rotating electric machine 140, which is transmitted from the higher-layer ECU 30 to the control device 10. FIG. 7D illustrates an example of the time variation in the braking/driving torque actually output from the rotating electric machine 140. FIG. 7E illustrates an example of the time variation in the hydraulic pressure measured by the hydraulic pressure sensor 201.

In the example illustrated in FIG. 7, the brake pedal is depressed at time t20, and the vehicle 100 is decelerating thereafter. Assuming that the amount of brake pedal depression is constant, the value of traveling torque is calculated as a constant value (Tr1) at or after time t20, as illustrated in FIG. 7A. As illustrated in FIG. 7B, at or after time t20, the vehicle speed decreases from V0 with an approximately constant slope.

Figure 7A:
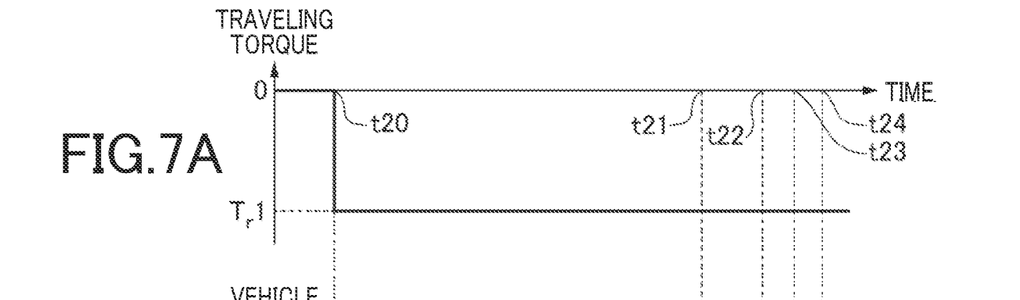
FIG. 7A is an illustration of a time variation in traveling torque in a case where control is performed by the control device according to the first embodiment.
Figures 7B, 7C:
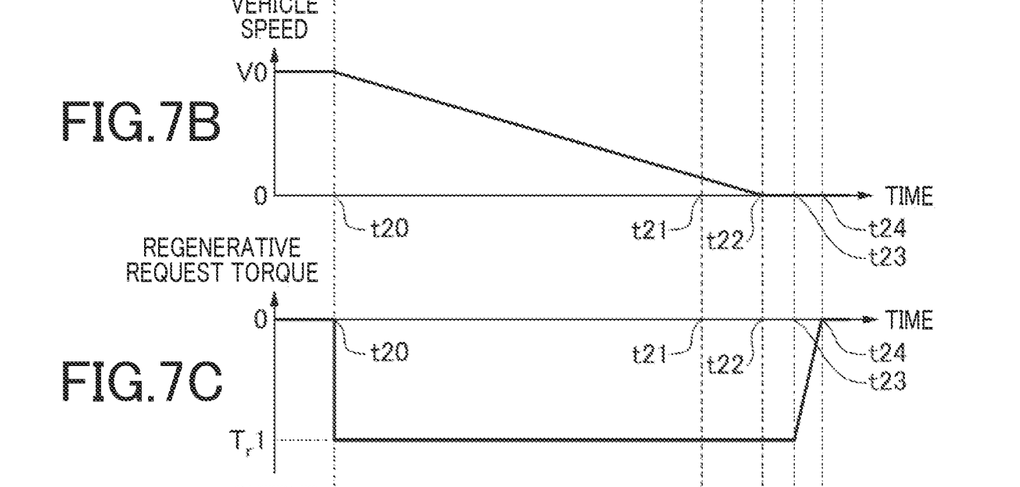
FIG. 7B is an illustration of a time variation in vehicle speed in the case where control is performed by the control device according to the first embodiment.
FIG. 7C is an illustration of a time variation in regeneration request torque in the case where control is performed by the control device according to the first embodiment.
Figure 7D:
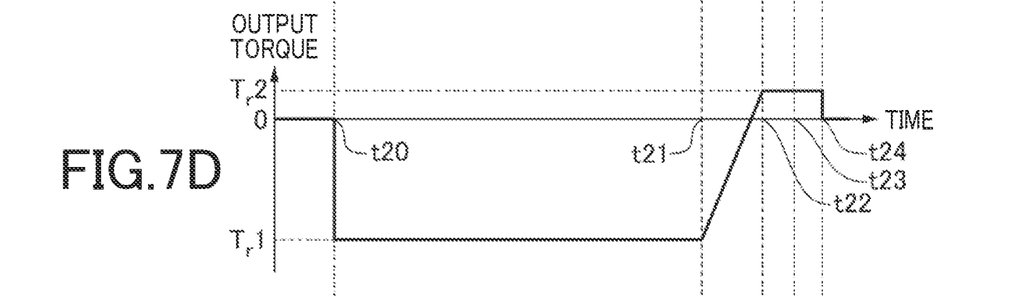
FIG. 7D is an illustration of a time variation in output torque in the case where control is performed by the control device according to the first embodiment.
Figure 7E:
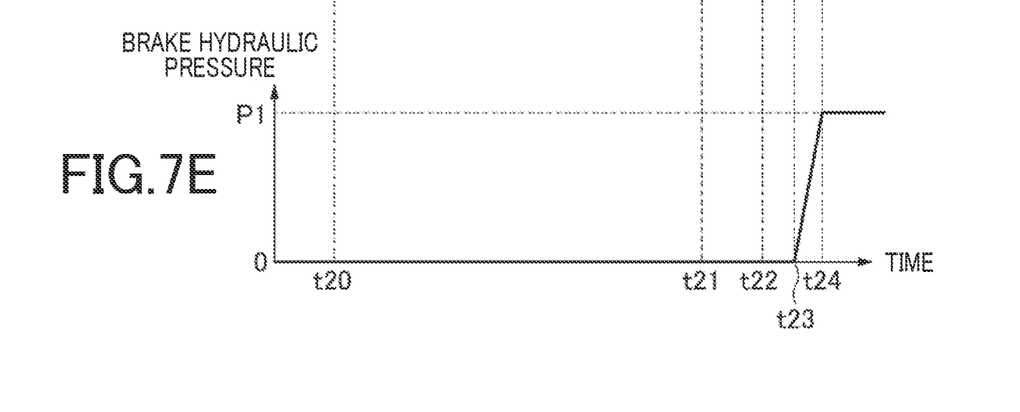
FIG. 7E is an illustration of a time variation in brake hydraulic pressure in the case where control is performed by the control device according to the first embodiment.

As illustrated in FIG. 7C, the regenerative torque transmitted from the higher-layer ECU 30 at or after time t20 matches the traveling torque illustrated in FIG. 7A. Thus, as illustrated in FIG. 7D, the value of the braking/driving torque actually output from the rotating electric machine 140 at or after time t20 is the same as the value of the regenerative torque (Tr1) transmitted from the higher-layer ECU 30. In the example illustrated in FIG. 7, the vehicle 100 is decelerated and brought to a stop only by the braking/driving torque from the rotating electric machine 140. Thus, as illustrated in FIG. 7E, the hydraulic pressure inside the braking device 121 or the like is zero even after time t20.

In the example illustrated in FIG. 7, time t21 is the target timing, and the stop process is performed during the period from time t21 to time t22. As illustrated in FIG. 7D, at or after time t21, the braking/driving torque output from the rotating electric machine 140 is varying in accordance with the stop waveform. This time variation is different from the time variation in the traveling torque illustrated in FIG. 7A and the time variation in the regenerative request torque illustrated in FIG. 7C. The stop waveform illustrated in FIG. 7D (waveform of the time variation from time t21 to time t22) is depicted as a linear waveform for the sake of simplicity.

In the example illustrated in FIG. 7, the stop process is performed when the vehicle 100 is traveling on an uphill road surface. Therefore, the value of the standstill torque Tr2 is greater than zero. As illustrated in FIG. 7D, at or after time t22, the rotating electric machine 140 is still outputting the standstill torque Tr2, thereby keeping the vehicle 100 in a stationary state.

However, if such a state is continued for an extended period of time, an amount of heat generated by the rotating electric machine 140 will increase, and power stored in the battery 150 will be consumed in vain. Thus, in the example illustrated in FIG. 7, after the stop process is completed, the braking/driving torque output from the rotating electric machine 140 is set to zero while the vehicle 100 remains in the stationary state by activating the braking devices 121 and 122.

Specifically, as illustrated in FIG. 7E, during the period from time t23 to time t24, the hydraulic pressure inside the braking device 121 and the like is set to P1, which is greater than zero. P1 is the hydraulic pressure that produces enough braking torque to keep the vehicle 100 stationary. As illustrated in FIG. 7D, at or after time t24 when the hydraulic pressure has increased to P1, the braking/driving torque output from the rotating electric machine 140 is set to zero. This process is performed by the control device 10 operating the brake device 121 and the like via the brake ECU 20.

Figure 8:
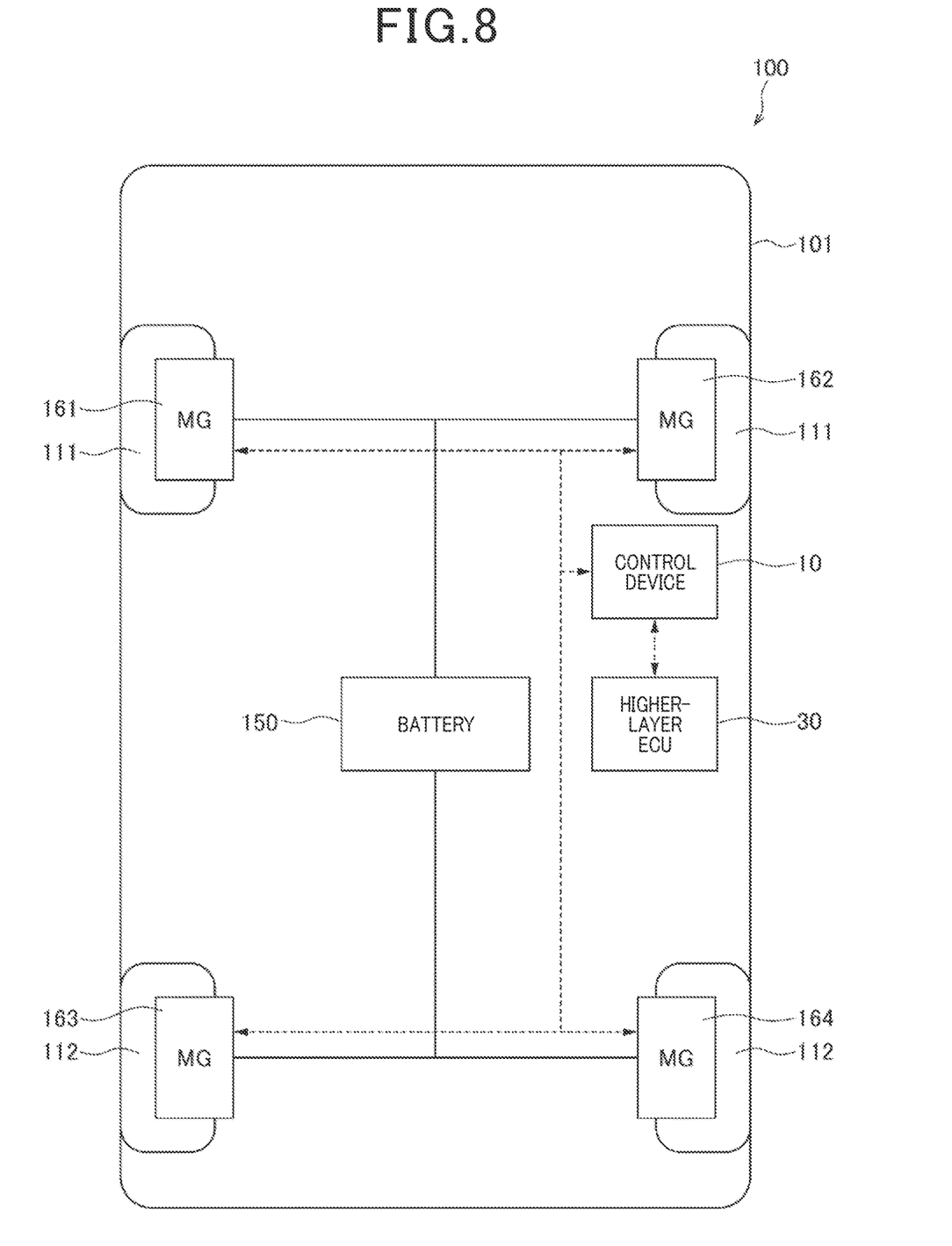
FIG. 8 is a schematic of a configuration of a vehicle equipped with a control device according to a second embodiment.

A second embodiment will now be described with reference to FIG. 8. The present embodiment differs from the first embodiment only in the configuration of the vehicle 100 carrying the control device 10. In the present embodiment, no rotating electric machine 140 in the example of FIG. 1 is mounted to the vehicle 100. Instead, rotating electric machines 161, 162, 163, and 164 are mounted to the vehicle 100, which are so-called "in-wheel motors" provided in the respective wheels 111.

The rotating electric machine 161 is embedded in the wheel 111 on the left side. The rotating electric machine 162 is embedded in the wheel 111 on the right side. The rotating electric machine 163 is embedded in the wheel 112 on the left side. The rotating electric machine 164 is embedded in the wheel 112 on the right side. These four wheels 111 and 112 may be provided with braking devices 121 and 122 as in the first embodiment.

The control device 10 in the present embodiment performs the same stop process as in the first embodiment by adjusting the braking/driving force of each of the four rotating electric machines 161, 162, 163, and 164. In this manner, the vehicle 100 controlled by the control device 10 may be a vehicle having the in-wheel motors mounted thereto.

In the above description, the case in which the vehicle 100 is configured as a four-wheel-drive vehicle is described, but the configuration of vehicle 100 may be different from each of the examples described above. For example, the vehicle 100 may be configured as a two-wheel-drive vehicle in which only the rear wheels 112 are drive wheels.

The present embodiment is thus far described with reference to specific examples. However, the present invention is not limited to these specific examples. Modifications resulting from appropriate design changes applied by those skilled in the art to these specific examples are also included in the scope of the present disclosure as long as the modifications have the features of the present disclosure. The elements, the arrangement of the elements, the conditions, the shapes, and the like of each of the above-described specific examples are not necessarily limited to those exemplified and can be appropriately changed. A combination of the respective elements included in each of the above-described specific examples can be appropriately changed as long as no technical inconsistency exists.

The control devices and methods described herein may be realized using one or more dedicated computers provided by configuring a processor and a memory programmed to execute one or more functions embodied by computer programs. The control devices and methods described herein may be realized using a dedicated computer provided by configuring a processor including one or more dedicated hardware logic circuits. The control devices and methods described herein may be realized using one or more dedicated computers configured by combining a processor and a memory programmed to execute one or more functions with a processor including one or more hardware logic circuits. The computer programs may be stored in a computer-readable, non-transitory tangible storage medium as instructions executed by the computer. A dedicated hardware logic circuit or a hardware logic circuit may be realized by a digital circuit or an analog circuit including a plurality of logic circuits.

What is claimed is:

1. A control device for a vehicle, the control device comprising:
   an operation controller that controls operations of a rotating electric machine mounted to the vehicle;
   a first torque detector that detects a traveling torque which is a braking/driving torque to be output from the rotating electric machine when the vehicle is traveling;
   a second torque detector that detects a standstill torque which is a braking/driving torque to be output from the rotating electric machine upon the vehicle coming to a stop; and
   a waveform setter that sets a stop waveform based on the traveling torque and the standstill torque, the stop waveform indicating a gradual variation over time of the braking/driving torque output from the rotating electric machine in changing from the traveling torque to the standstill torque, wherein
   the operation controller is configured to perform a stop process that is a process to bring the vehicle to a stop while changing the braking/driving torque output from the rotating electric machine in accordance with the stop waveform.

2. The control device according to claim 1, wherein
the operation controller initiates the stop process at a predefined target timing such that a point in time when the braking/driving torque output from the rotating electric machine reaches the standstill torque and a point in time when the vehicle comes to a stop coincide with each other.

3. The control device according to claim 2, wherein
the predefined target timing is set as a timing at which a number of rotations per unit time of wheels of the vehicle decreases to a predefined target rotational speed.

4. The control device according to claim 3, wherein
the operation controller sets the target rotational speed based on a difference between the traveling torque and the standstill torque.

5. The control device according to claim 1, wherein
the waveform setter sets the stop waveform as a waveform including a frequency component higher in frequency than a pitch resonance frequency of the vehicle.

6. The control device according to claim 1, wherein
the waveform setter sets the stop waveform such that a slope of a time variation of the stop waveform immediately after the stop process is initiated is less than or equal to a predefined value.

7. The control device according to claim 1, wherein
the second torque detector detects the standstill torque as a torque required to keep the vehicle in a stationary state after completion of the stop process.

8. The control device according to claim 7, wherein
the second torque detector calculates the standstill torque based on a signal from an acceleration sensor installed in the vehicle.

* * * * *